United States Patent Office 3,086,939
Patented Apr. 23, 1963

3,086,939
PROCESS FOR NEUTRALIZING DIHYDROCARBON DITHIOPHOSPHORIC ACID
George R. Tichelaar, Carmichael, Calif., and Robert E. Karll, Munster, Ind., assignors to Standard Oil Company, Chicago, Ill., a corporation of Indiana
No Drawing. Filed Nov. 13, 1961, Ser. No. 152,085
8 Claims. (Cl. 252—18)

This invention relates to improvement in the making of zinc dihydrocarbon dithiophosphates.

Zinc dihydrocarbon dithiophosphates are useful as corrosion inhibitors, especially for prevention of corrosion to internal combustion engine parts. Zinc dihydrocarbon dithiophosphates have been prepared by batch and continuous processes. In batch processes usually a slurry of zinc oxide in oil is charged to a reaction zone containing dihydrocarbon dithiophosphoric acid and the acid is neutralized by the zinc oxide at elevated temperatures. In continuous processing, the slurry of zinc oxide and the dihydrocarbon dithiophosphoric acid may be charged to one end of a reaction zone, e.g. the upper end of a vertical zone, maintained at elevated temperatures and the product neutralized zinc dihydrocarbon dithiophosphate may be withdrawn from the other end of the reaction zone. If desired, the product from either the batch or continuous process may be further purified by clay percolation or the like to remove insoluble components.

The zinc oxide, as discussed above, is used in the form of an oil slurry. It has been found that the more coarse oxides, such as those that can be prepared by the "American Process," a process in which the oxide is prepared directly from the ore by oxidizing the zinc sulfide and zinc sulfate ore to zinc oxide, are capable of slurrying in oil and have, for this reason, heretofore been preferred. The American Process can be controlled to produce either the coarse zinc oxide which has been preferred for use in forming oil slurries for neutralization of dihydrocarbon dithiophosphoric acid or can also be used to produce a finer grade of the zinc oxide. The finer grade zinc oxide, i.e of smaller particle size than the coarse grade, is also produced by the "French Process" which produces zinc oxide indirectly from the ore, i.e. the ore is reduced to the metal and then oxidized to zinc oxide. The finer grade zinc oxide or finely divided zinc oxide often has not been useful in the production of zinc dihydrocarbon dithiophosphates because it has been at least extremely difficult to form acceptable slurries of zinc oxide in oil. Where a reasonable amount of oil is utilized in an attempt to slurry the zinc oxide, the greater surface area of the more finely divided zinc oxide often causes thickening and even gelling of the slurry. Such thickened or gelled slurries are not readily pumpable to the neutralization reaction zone.

It is an object of the present invention to provide an improvement in the making of zinc dihydrocarbon dithiophosphates which permits the use of slurried finely divided zinc oxides. It is a further object of this invention to inhibit the formation of gels and inhibit the thickening of oil slurried zinc oxide. It is also an object of this invention to "break" gels formed in zinc oxide oil slurries for use in the neutralization of dihydrocarbon dithiophosphates.

In accordance with the present invention, small amounts of oil soluble zinc dihydrocarbon dithiophosphate are added to the slurry of zinc oxide in oil for use in the preparation of zinc dihydrocarbon dithiophosphates. The added zinc dihydrocarbon dithiophosphate breaks gels and inhibits thickening in the slurry of zinc oxide in oil. The zinc dihydrocarbon dithiophosphate added to the slurry can conveniently be obtained as recycled product. The amount of zinc dihydrocarbon dithiophosphate added to the slurry is a small amount sufficient to inhibit thickening and gelling, e.g. in the range of 0.05 to 1% by weight. Of course, the amount will vary with the concentration of zinc oxide in the oil slurry. It is intended that greater or lesser amounts than those specifically exemplified herein can be used where desired or necessary.

The improvement or technique of this invention is applicable in the preparation of zinc salts of any dihydrocarbon dithiophosphoric acid. Two zinc dihydrocarbon dithiophosphates which have been in commercial production are those having the hydrocarbon groups prepared from alcohol mixtures. Both are zinc dialkyl dithiophosphates, one having the alkyl groups derived from admixture of isopropyl alcohol and oxodecyl alcohol and the other having the alkyl groups derived from a mixture of isopropyl alcohol and octyl alcohol. Other illustrative dihydrocarbon dithiophosphates which can be prepared from the corresponding dihydrocarbon dithiophosphoric acids are zinc dimethyl dithiophosphate, zinc dilauryl dithiophosphate, zinc dioleyl dithiophosphate, zinc diphenyl dithiophosphate, zinc naphthenyl oxodecyl dithiophosphate, zinc dihexyl dithiophosphate, zinc dicyclohexyl dithiophosphate, etc.

The neutralization reaction is usually carried out at elevated temperatures, e.g. temperatures in the range of 100° F. to about 300–400° F. The neutralization is effected by contacting the zinc oxide slurry with the dihydrocarbon dithiophosphoric acid for a time sufficient to neutralize the acid. The reaction may usually be completed within a period of from 10 minutes to 4-5 hours. The neutralized product can be used as a corrosion inhibitor without the separation of oil slurrying medium or, if a high-purity zinc dihydrocarbon dithiophosphate is desired, the oil medium may be separated from the salt by solvent extraction, distillation, etc.

The oil used in the slurry is preferably a light lubricating oil; however, heavier lubricating oils can be used if desired. The lighter oils are preferred because of their lower viscosities and the greater ease of pumping such oils or slurries containing such oils. Although hydrocarbon oils and particularly petroleum oils were utilized in the procedure set out below, it is intended that other oils can also be used such as the synthetic hydrocarbon polymer oils prepared by the condensation of alkaline oxides and the like. Ester oils are not preferred because of the possibility of their dissociation in the presence of zinc oxide under the neutralization reaction conditions. Other useable oils are the distillate fuel oils such as kerosene, heater oils, dewaxed cycle oils and the like. The light lubricating oils are particularly preferred.

In order to further describe the present process, the following typical example of the technique of this invention is provided: In a plant manufacture of zinc dialkyl dithiophosphate the neutralization step is accomplished by making a slurry of American Process coarse zinc oxide and SAE 5W mineral lubricating oil using 1.6 lbs. of oil per pound of zinc oxide. The slurry is pumpable and is pumped to a neutralization kettle. The dialkyl dithiophosphoric acid is added to the kettle. The American Process coarse zinc oxide gives a pumpable slurry when used in the oil. In the typical plant manufacture of zinc dialkyl dithiophosphate as set out above, but using the French Process finer particle size and lighter density zinc oxide in lieu of the coarse zinc oxide, the zinc oxide requires larger amounts of diluent oil to give a pumpable slurry and cannot be used within the limitation of the plant slurry-handling and neutralization kettle capacities, because the excess diluent increases the size of the slurry and reaction mass per amount of reactant and ultimate yield. The addition of 0.17 weight percent of zinc dialkyl dithiophosphate to the slurry mixture allows the use of the finer French Process zinc oxide in more concentrated slurries, e.g. 1 lb. of zinc oxide for each 1.6 lbs. of the SAE 5W slurrying oil.

To further illustrate this invention, tests were run to determine the ability of zinc dihydrocarbon dithiophosphate in breaking or preventing thickening or gelling. In each test, 31.2 g. of a brand of French Process zinc oxide commercially aavilable was added to 50.0 g. of solvent extracted SAE 5W mineral lubricating oil containing the amount of zinc dialkyl dithiophosphate indicated in the table below. The zinc dialkyl dithiophosphate used was the zinc salt of the dialkyl dithiophosphoric acid derived from 30 mole percent isopropyl alcohol and 70 mole percent oxodecyl alcohol.

Table

| Zinc Oxide Brand | Zinc Dialkyl Dithiophosphate Added, Wt. Percent ||
|---|---|---|
| | None | 0.17 Wt. Percent |
| Brand M | gel | good slurry. |
| Brand K | gel | good slurry. |
| Brand D | gel | good slurry. |

The above tests demonstrate the ability of the oil-soluble zinc dihydrocarbon dithiophosphate in the inhibition or breaking of gelling or thickening in the zinc oxide-oil slurry. Although we do not intend to be held to any theories regarding the operation of the present invention, it is believed that the zinc salt acts as a dispersant type wetting agent and causes the zinc particles to become dispersed within the oil by decreasing the surface area on the zinc oxide particles available for adsorption of oil. In any event, it is evident that we have provided an improvement in the preparation of zinc salts of dihydrocarbon dithiophosphoric acids, permitting use of finely divided zinc oxide in slurry form without undesirable thickening or gelling of the slurry.

All percentages given herein are percentages by weight unless otherwise indicated.

We claim:

1. In a process for making zinc dihydrocarbon dithiophosphates wherein dihydrocarbon dithiophosphoric acid is neutralized with zinc oxide by treating said acid with oil-slurried zinc oxide and wherein a neutralized product is obtained, in combination with said process the step of adding said neutralized product to the slurry of zinc oxide in an amount sufficient to disperse zinc oxide in said slurry.

2. In a process for making zinc dialkyl dithiophosphate by forming an oil slurry of zinc oxide in light hydrocarbon oil and neutralizing dialkyl dithiophosphoric acid by treating with said slurry to form a neutralized product and wherein there is used finely divided zinc oxide which normally tends to gel or thicken said slurry and decrease its pumpability in combination with said process the technique of recycling neutralized product to said slurry prior to said neutralizing step in an amount sufficient to inhibit thickening of the slurry.

3. The process of claim 2 wherein said finely divided zinc oxide is obtained by oxidation of metallic zinc.

4. The process of claim 2 wherein the alkyl groups of the dialkyl dithiophosphoric acid and resulting zinc salt thereof are derived from a mixture of isopropyl alcohol and oxodecyl alcohol.

5. The process of claim 2 wherein the alkyl groups of the dialkyl dithiophosphoric acid and resulting zinc salt thereof are derived from a mixture of isopropyl alcohol and octyl alcohol.

6. A method for inhibiting the thickening of a slurry containing an amount of zinc oxide normally sufficient to cause such thickening, which method comprises including in said slurry an amount of zinc dihydrocarbon dithiophosphate sufficient to inhibit said thickening.

7. As a composition of matter, a slurry comprising lubricating oil containing an amount of zinc oxide normally sufficient to thicken said oil and an amount of zinc dihydrocarbon dithiophosphate sufficient to inhibit the thickening of said oil.

8. The composition of claim 7 wherein the lubricating oil is a light mineral lubricating oil.

References Cited in the file of this patent

UNITED STATES PATENTS

| 2,466,408 | Funk | Apr. 5, 1949 |
| 2,535,024 | Funk | Dec. 26, 1950 |